US012563586B2

(12) United States Patent
Khoryaev et al.

(10) Patent No.: US 12,563,586 B2
(45) Date of Patent: Feb. 24, 2026

(54) DETERMINING COLLISIONS AND CONFLICTS FOR SIDELINK COMMUNICATIONS

(71) Applicant: Intel Corporation, Santa Clara, CA (US)

(72) Inventors: Alexey Khoryaev, Nizhny Novgorod (RU); Mikhail Shilov, Nizhny Novgorod (RU); Artyom Lomayev, Nizhny Novgorod (RU); Artyom Putilin, Kstovo (RU); Kilian Peter Anton Roth, Munich (DE); Sergey Panteleev, Maynooth (IE); Andrey Chervyakov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 18/280,078

(22) PCT Filed: Mar. 30, 2022

(86) PCT No.: PCT/US2022/022486
§ 371 (c)(1),
(2) Date: Sep. 1, 2023

(87) PCT Pub. No.: WO2022/212460
PCT Pub. Date: Oct. 6, 2022

(65) Prior Publication Data
US 2024/0155666 A1      May 9, 2024

Related U.S. Application Data

(60) Provisional application No. 63/169,759, filed on Apr. 1, 2021, provisional application No. 63/169,711, filed on Apr. 1, 2021.

(51) Int. Cl.
*H04W 72/566* (2023.01)
*H04L 5/16* (2006.01)
(Continued)

(52) U.S. Cl.
CPC ............. *H04W 72/566* (2023.01); *H04L 5/16* (2013.01); *H04W 72/0446* (2013.01); *H04W 72/25* (2023.01)

(58) Field of Classification Search
CPC ........... H04W 72/566; H04W 72/0446; H04W 72/25; H04W 4/46; H04W 72/20;
(Continued)

(56) References Cited

U.S. PATENT DOCUMENTS

2020/0229171 A1    7/2020    Khoryaev et al.
2021/0051525 A1    2/2021    Cao et al.
(Continued)

FOREIGN PATENT DOCUMENTS

JP        2023553012        12/2023
WO        2019148489        8/2019
(Continued)

OTHER PUBLICATIONS

"International Application Serial No. PCT US2022 022486, International Preliminary Report on Patentability mailed Oct. 12, 2023", 8 pgs.
(Continued)

*Primary Examiner* — Vinncelas Louis
(74) *Attorney, Agent, or Firm* — Schwegman Lundberg & Woessner, P.A.

(57) ABSTRACT
A computer-readable storage medium stores instructions to configure a UE for sidelink operation in a 5G NR network, and to cause the UE to perform operations including encoding a first SCI for transmission. The first SCI includes a first resource reservation for a subsequent sidelink transmission
(Continued)

by the UE in a pre-selected slot. A second SCI received from a second UE is decoded. The second SCI includes a second resource reservation for a subsequent sidelink transmission by the second UE in the pre-selected slot. A reservation conflict is detected based on the first resource reservation and the second resource reservation using the pre-selected slot. A third SCI is encoded for transmission based on the detection of the reservation conflict. The third SCI includes a modified version of the first resource reservation for the subsequent sidelink transmission by the UE.

20 Claims, 13 Drawing Sheets

(51) Int. Cl.
　　 *H04W 72/0446* 　　 (2023.01)
　　 *H04W 72/25* 　　 (2023.01)
(58) Field of Classification Search
　　 CPC ..... H04W 72/02; H04W 76/14; H04W 92/18;
　　　　　　 H04W 4/40; H04W 28/26; H04W 72/53;
　　　　　　 H04W 72/569; H04W 72/0453; H04L
　　　　　　　　　　　　　　　　　　　　　　　　 5/16
　　 See application file for complete search history.

(56) References Cited

U.S. PATENT DOCUMENTS

| | | | |
|---|---|---|---|
| 2021/0058905 A1 | 2/2021 | Ganesan et al. | |
| 2022/0086803 A1* | 3/2022 | Li | H04W 72/0453 |
| 2023/0262737 A1* | 8/2023 | Wang | H04W 72/25 |
| | | | 370/329 |

FOREIGN PATENT DOCUMENTS

| | | |
|---|---|---|
| WO | 2020198760 | 10/2020 |
| WO | 2022118301 | 6/2022 |
| WO | WO-2022212460 A1 | 10/2022 |

OTHER PUBLICATIONS

"Japanese Application Serial No. 2023-559141, Notification of Reasons for Rejection mailed Nov. 19, 2024", W English Translation, 9 pgs.

"Japanese Application Serial No. 2023-559141, Response filed Feb. 19, 2025 to Notification of Reasons for Rejection mailed Nov. 19, 2024", w current English claims, 17 pgs.

"Inter-UE Coordination for Mode 2 Resource Allocation", Apple, R1-2101358, 3GPP TSG RAN WG1 #104-e, e-Meeting, (Jan. 18, 2021).

"International Application Serial No. PCT/US2022/022486, International Search Report mailed Jun. 30, 2022", 3 pgs.

"International Application Serial No. PCT/US2022/022486, Written Opinion mailed Jun. 30, 2022", 6 pgs.

"On inter-UE coordination for Mode 2 enhancement", Interdigital, Inc., R1-2100982, 3GPP TSG RAN WG1 #104-e, e-Meeting, (Jan. 18, 2021).

"Reliability and Latency Enhancements for Mode 2", Qualcomm Incorporated, R1-2101486, 3GPP TSG RAN WG1 Meeting #104-e, (Jan. 19, 2021).

* cited by examiner

140C

NSSF 142
Nnssf 158A

NEF 154
Nnef 158B

NRF 156
Nnrf 158C

PCF 148
Npcf 158D

UDM 146
Nudm 158E

AF 150
Naf 158F

AUSF 144
Nausf 158G

AMF 132
Namf 158H

SMF 136
Nsmf 158I

N1

N2

N4

N9

N3

N6

UE 101

UU (R)AN 110

UPF 134

DN 152

DETERMINING COLLISIONS AND CONFLICTS FOR SIDELINK COMMUNICATIONS

PRIORITY CLAIM

This application is a U.S. National Stage Filing under 35 U.S.C. 371 from International Application No. PCT/US2022/022486, filed Mar. 30, 2022 and published in English as WO 2022/2125460 on Oct. 6, 2022, which claims the benefit of priority to the following United States Provisional Patent Applications:

U.S. Provisional Patent Application No. 63/169,711, filed Apr. 1, 2021, and entitled "METHODS TO DETERMINE SIDELINK COLLISIONS AND HALF-DUPLEX CONFLICTS FOR RELIABLE SIDELINK COMMUNICATION WITH INTER-UE COORDINATION FEEDBACK;" and U.S. Provisional Patent Application No. 63/169,759, filed Apr. 1, 2021, and entitled "METHODS TO DETERMINE SIDELINK COLLISIONS AND HALF-DUPLEX CONFLICTS BY TRANSMITTING UES AND ENHANCED RESOURCE (RE)-ELECTION PROCEDURES."

Each of the patent applications listed above is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks and beyond including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to mechanisms for determining sidelink (SL) collisions and half-duplex conflicts for reliable SL communication with inter-UE coordination feedback. Additional aspects are directed to mechanisms for determining SL collisions and half-duplex conflicts by transmitting UEs and enhanced resource (re-)selection procedures.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. Further enhanced operation of LTE and NR systems in the licensed, as well as unlicensed spectrum, is expected in future releases and 5G (and beyond) systems. Such enhanced operations can include mechanisms for determining sidelink (SL) collisions and half-duplex conflicts for reliable SL communication with inter-UE coordination feedback. Additional aspects are directed to mechanisms for determining SL collisions and half-duplex conflicts by transmitting UEs and enhanced resource (re-)selection procedures.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
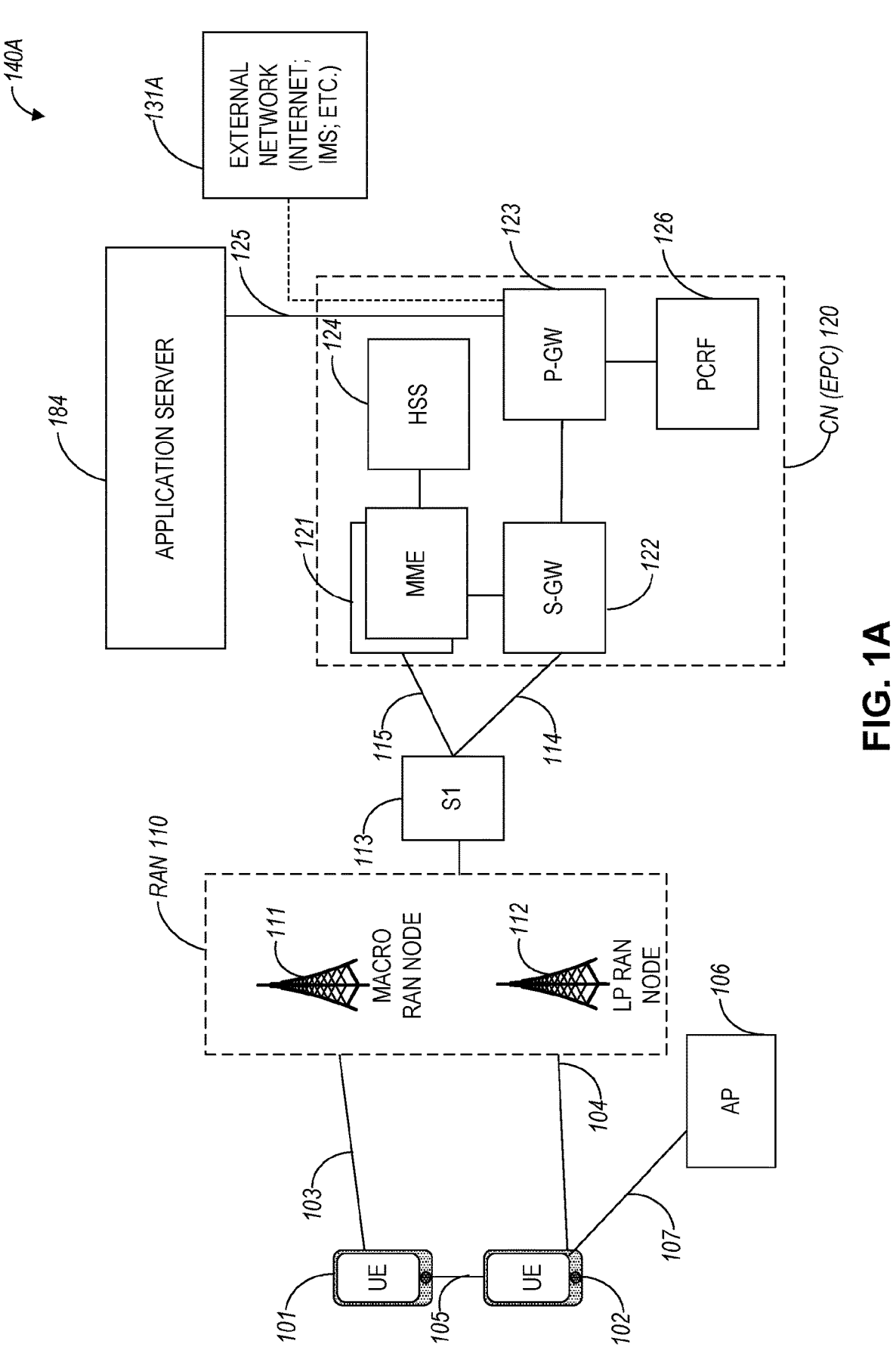
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (P SB CH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
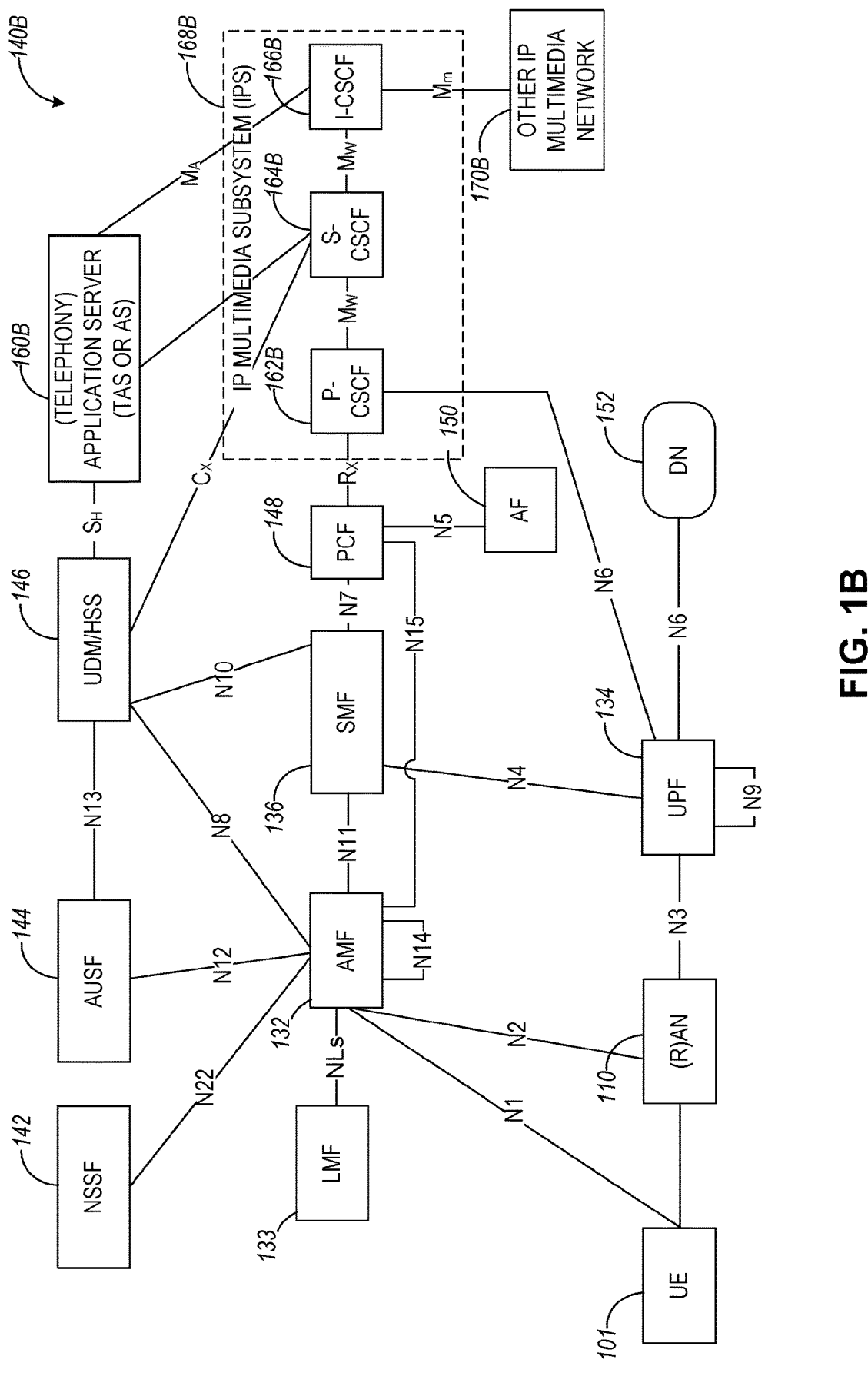
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, location management function (LMF) 133, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The LMF 133 may be used in connection with 5G positioning functionalities. In some aspects, LMF 133 receives measurements and assistance information from the next generation radio access network (NG-RAN) 110 and the mobile device (e.g., UE 101) via the AMF 132 over the NLs interface to compute the position of the UE 101. In some aspects, NR positioning protocol A (NRPPa) may be used to carry the positioning information between NG-RAN and LMF 133 over a next generation control plane interface (NG-C). In some aspects, LMF 133 configures the UE using the LTE positioning protocol (LPP) via AMF 132. The NG RAN 110 configures the UE 101 using radio resource control (RRC) protocol over LTE-Uu and NR-Uu interfaces.

In some aspects, the 5G system architecture 140B configures different reference signals to enable positioning measurements. Example reference signals that may be used for positioning measurements include the positioning reference signal (NR PRS) in the downlink and the sounding reference signal (SRS) for positioning in the uplink. The downlink positioning reference signal (PRS) is a reference signal configured to support downlink-based positioning methods.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points N1 or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Figure 2:
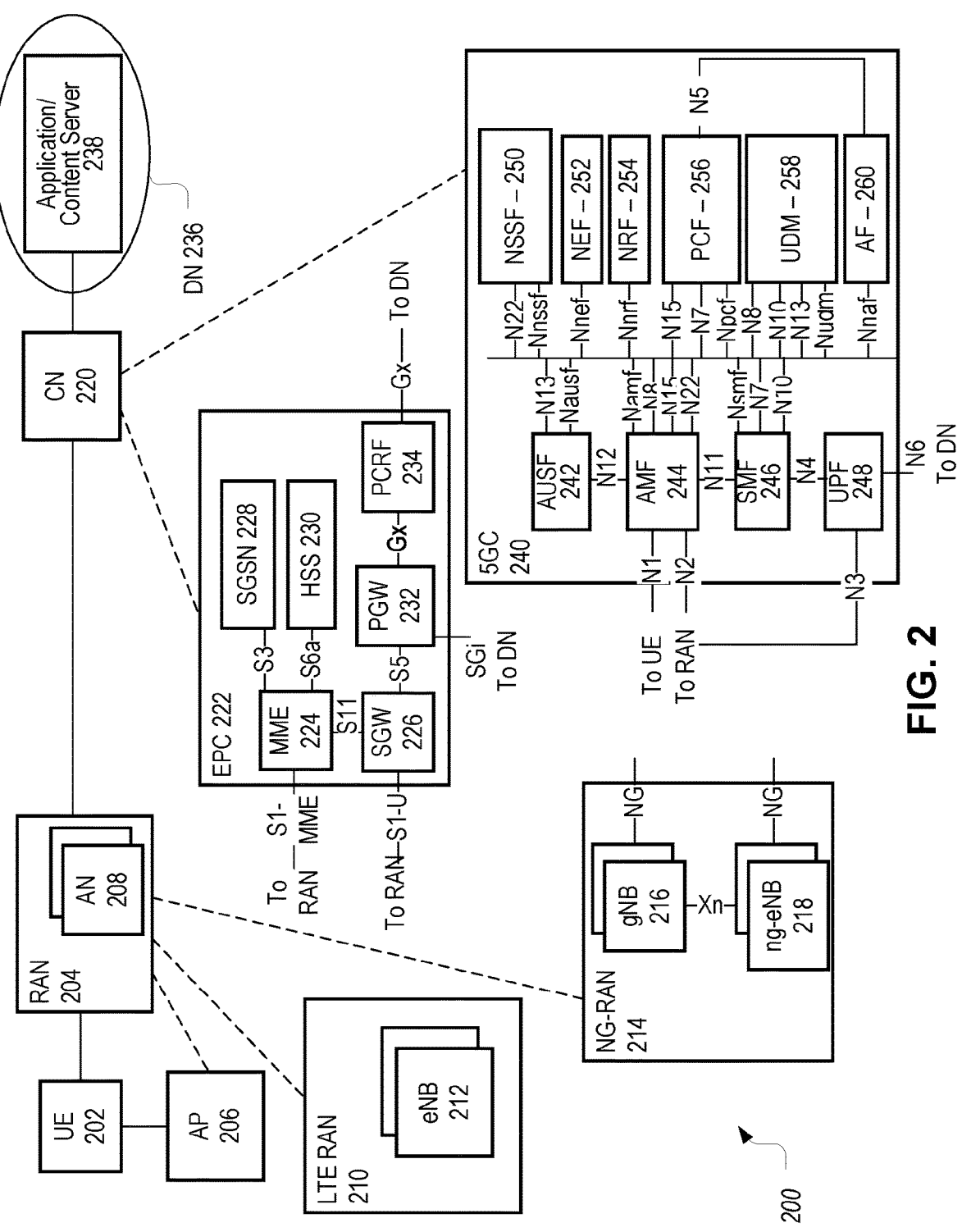
FIG. 2, FIG. 3, and FIG. 4 illustrate various systems, devices, and components that may implement aspects of disclosed embodiments.
Figure 3:
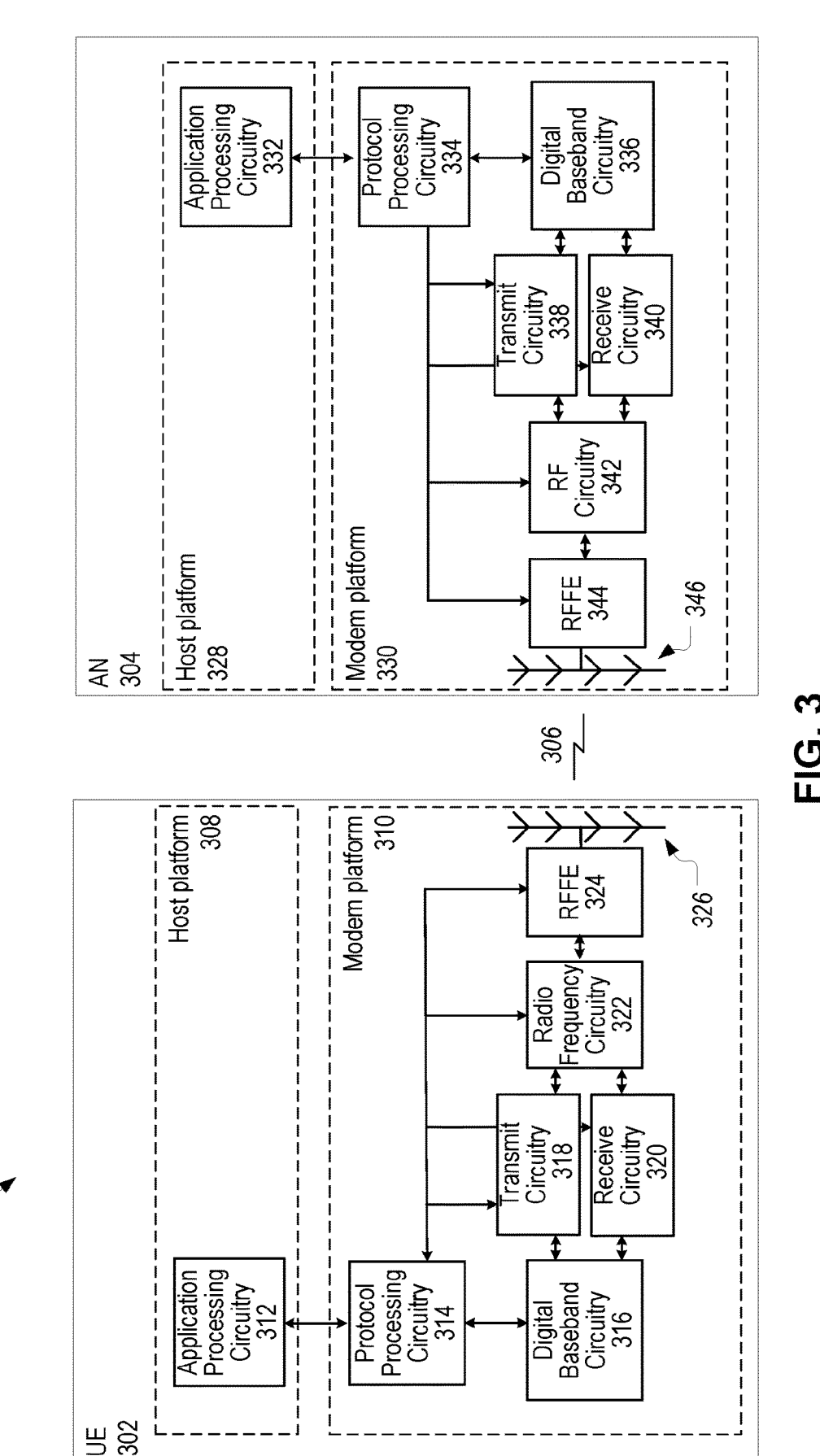
Figure 4:
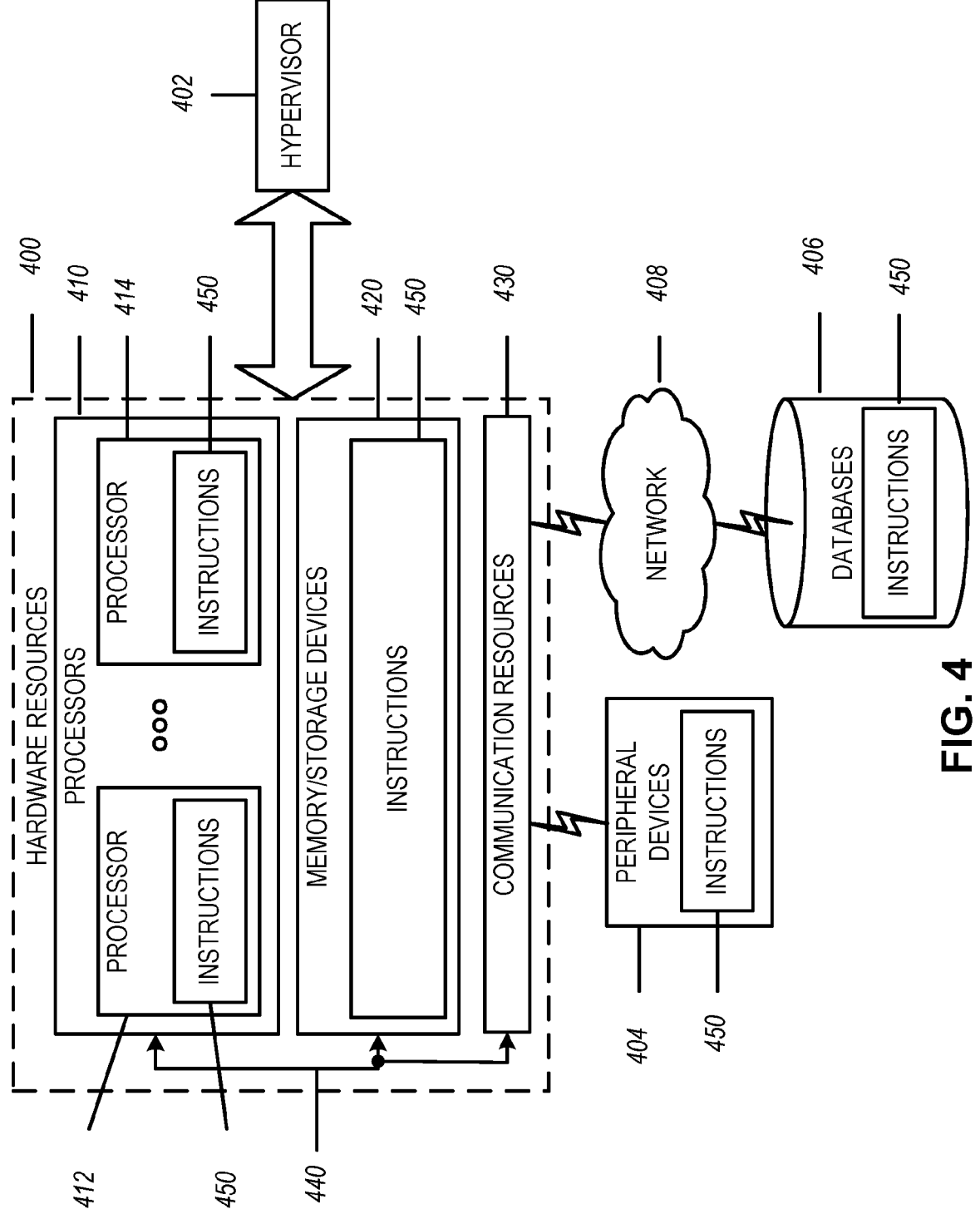

FIG. 2, FIG. 3, and FIG. 4 illustrate various systems, devices, and components that may implement aspects of disclosed embodiments in different communication systems, such as 5G-NR (and beyond) networks. UEs, base stations (such as gNBs), and/or other nodes (e.g., satellites or other NTN nodes) discussed in connection with FIGS. 1A-4 can be configured to perform the disclosed techniques.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN214 and an AMF 244 (e.g., N2 interface).

The NG-RAN 214 may provide a 5G-NR air interface with the following characteristics: variable SCS; CP-OFDM for DL, CP-OFDM, and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include a synchronization signal and physical broadcast channel (SS/PBCH) block (SSB) that is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 which includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An Sha reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 220 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 220. The PCRF 234 may be communicatively coupled to the app/content server 238 to determine appropriate QoS and charging parameters for service flows. The PCRF 234 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide the information of the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant for policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR to allow the UDM 258, PCF 256, and NEF 252 to access a particular set of the stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate transmission or reception of data over the connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, baseband circuitry associated with one or more of the preceding figures may be configured to operate in accordance with one or more of the examples set forth below. For another example, circuitry associated with a UE, base station, satellite, network element, etc. as described above in connection with one or more of the preceding figures may be configured to operate in accordance with one or more of the examples set forth below in the example section.

The term "application" may refer to a complete and deployable package, environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principal component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides for an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

High reliability and low latency of sidelink V2X communication are critical KPIs for NR V2X systems. In NR Rel. 17, inter-UE coordination methods are beneficial for sidelink reliability enhancements. The disclosed techniques include specific inter-UE coordination solutions that can provide low latency and high reliability for the future generation of NR V2X systems. In some aspects, the following components of a baseline NR V2X system can be used:

(a) UEs transmitting sidelink data (communicating in either unicast or groupcast or broadcast mode) use a control channel to reserve sidelink resources for future retransmissions of the TB.

(b) UEs monitor the sidelink control channel in each slot and perform sensing procedures by decoding control channel transmissions from other UEs and measuring SL-RSRP.

(c) Sidelink resources selected for transmission are determined based on results of sensing and resource (re)-selection procedure aiming to avoid collision among UEs.

(d) UEs use the sidelink feedback channel introduced for HARQ operation in the case of unicast and groupcast communication.

The procedures of UE-autonomous sensing and resource (re)-selection defined in Rel. 16 provide performance benefits over the random resource (re)-selection. The disclosed techniques include enhancements to further improve the reliability of NR V2X sidelink communication using low latency inter-UE coordination feedback signaling.

Inter-UE coordination signaling can help to increase reliability by reducing the negative performance impact due to half-duplex and co-cannel collision events in Rel. 16 NR-V2X communication systems. The disclosed techniques can be used to distinguish between sidelink conflicts such as half-duplex and co-channel collisions and use the following definitions.

Half-duplex and Co-channel Collision Sidelink Conflicts:

(A) Half-duplex conflicts.

(A.1) $UE_P$ has a half-duplex event with $UE_Q$ if $UE_P$ is a target RX of $UE_Q$ (e.g. $UE_P$ is a member of the $UE_Q$ group) and may not be able to receive transmissions from $UE_Q$ due to its transmission. The following half-duplex conflicts can be distinguished:

(A.1.a) Half-duplex in transmission (HD-TX): $UE_P$ and $UE_Q$ have already transmitted in the same sidelink slot (on overlapped or non-overlapped resources in frequency). This type of collision can be addressed by introducing new inter-UE coordination signaling.

(A.1.b) Half-duplex in reception (HD-RX): $UE_P$ reserved a resource for transmission to $UE_Q$ in slot 'n'. $UE_Q$ is scheduled for more prioritized uplink (UL) or sidelink (SL) transmission and thus cannot receive a transmission from $UE_P$ on a reserved resource in slot 'n'. This type of conflict can be partially addressed by introducing new inter-UE coordination signaling if this signaling can be received before transmission on the reserved resource.

(A.1.c) Half-duplex in resource selection (HD-SLCT): $UE_P$ and $UE_Q$ have selected resources for transmission in the same slot (on overlapped or non-overlapped resources in frequency). This type of conflict can be partially addressed by (re)-evaluation procedure defined in Rel. 16 if reservation for selected resources has not been done yet by one of UEs and there is enough processing delay to reselect resource.

(A.1.d) Half-duplex in resource reservation (HD-RSV): $UE_P$ and $UE_Q$ have reserved resources for transmission in the same slot (on overlapped or non-overlapped resources in frequency). This type of conflict can be addressed by introducing new inter-UE coordination signaling.

(A.2) Half-duplex may significantly degrade the performance of sidelink reception for other RX UEs as if $UE_P$ and $UE_Q$ transmitted on overlapping frequency resources (co-channel collision) both transmissions will not be decodable.

(B) Co-channel collision.

(B. 1) $UE_P$ has a co-channel collision with $UE_Q$ if $UE_P$ and $UE_Q$ transmit on overlapping frequency or time resources. The following co-channel collision types can be distinguished as follows:

(B. 0.1.a) Co-channel collision in transmission (CC-TX). In this case, the TX UEs ($UE_P$ and $UE_Q$) have already transmitted in the same sidelink slot on overlapping frequency resources (full or partial overlap).

(B. 1.b) Co-channel collision in resource selection (CC-RS). In this case, the TX UEs ($UE_P$ and $UE_Q$) have selected resources for transmission in the same slot on overlapping frequency resources (full or partial overlap). In some aspects, this event may not be detectable unless one of the TX UEs already made a resource reservation.

(B 0.1. c) Co-channel collision in resource reservation (CC-RSV). In this case, the TX UEs ($UE_P$ and $UE_Q$) have reserved resources for transmission in the same slot on overlapping frequency resources (full or partial overlap).

The sidelink conflicts described above are considered from a single TX UE perspective.

In some aspects, the half-duplex and co-channel collisions may happen on resources used for either initial transmission of a transport block (TB) or retransmission or various combinations from the TX UE perspective:

(a) Combination-A. Resources used for initial transmission of a TB by $UE_P$ and $UE_Q$.

(b) Combination-B. Resources used for retransmissions of a TB by $UE_P$ and $UE_Q$.

(c) Combination-C. Resource used for initial transmission of a TB by $UE_P$ and resource carrying retransmission of a TB by $UE_Q$.

Figure 5:
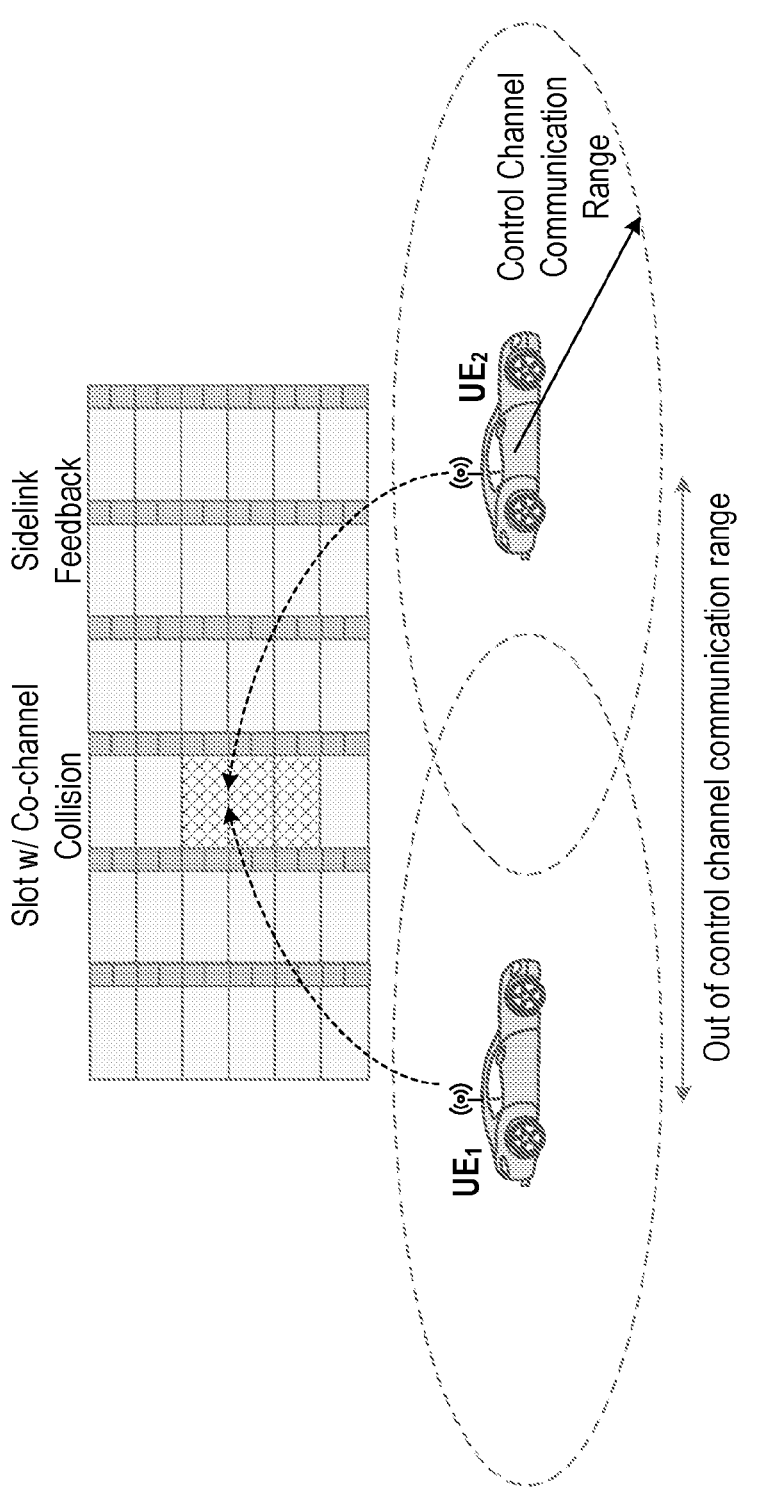
FIG. 5 illustrates a diagram of a type-1 hidden node collision, in accordance with some aspects.

The following co-channel collision types exist in the Rel. 16 V2X design:

(a) Type-1 (Hidden Node): Co-channel collisions due to hidden node problem. FIG. 5 illustrates diagram 500 of a type-1 hidden node collision, in accordance with some aspects. Transmitting UE(s) are out of communication range from each other (i.e., cannot sense each other) but within the communication range of an RX UE.

Figure 6:
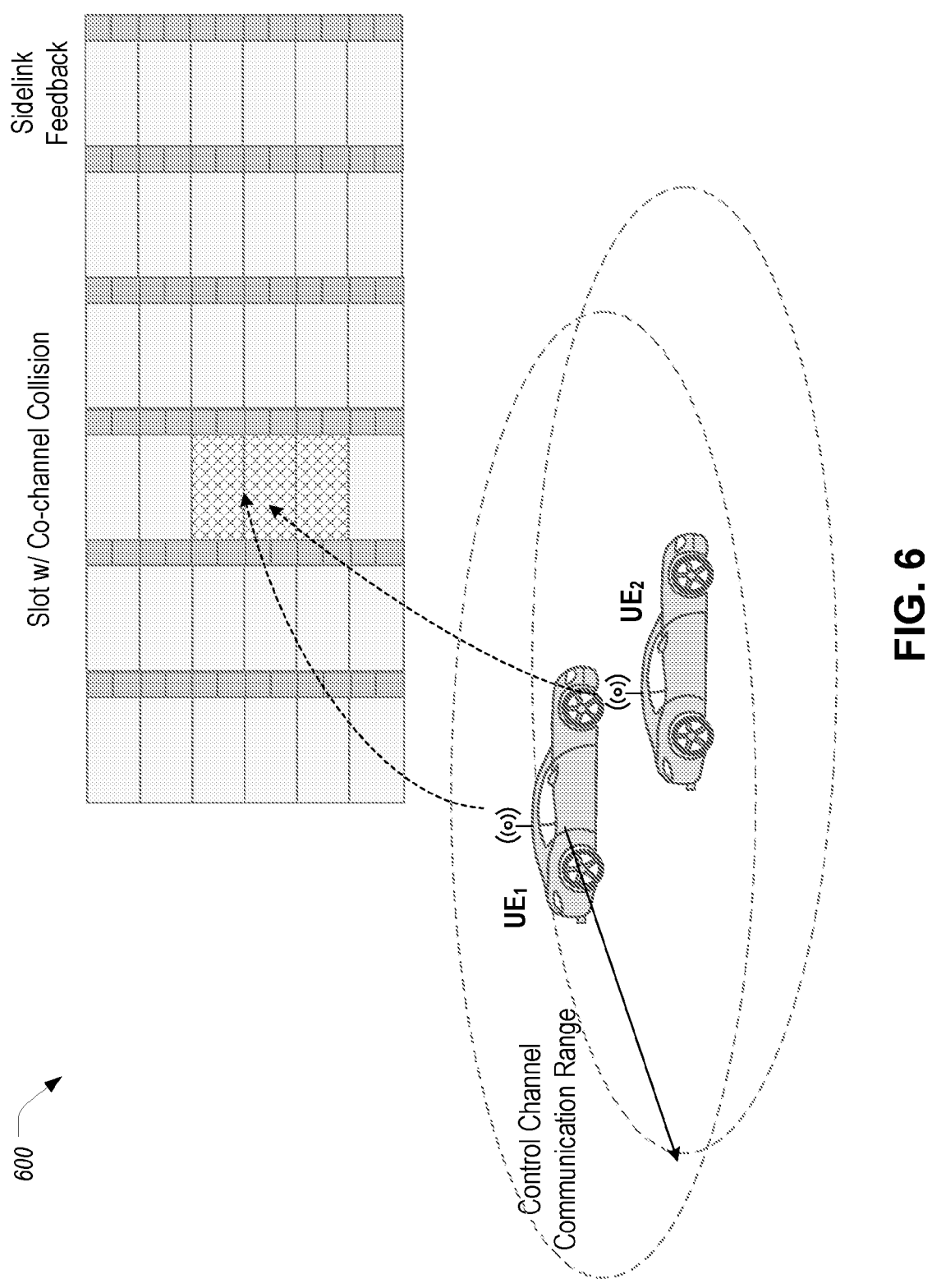
FIG. 6 illustrates a diagram of a type-2 simultaneous access collision, in accordance with some aspects.

(b) Type-2 (Simultaneous Access): Co-channel collisions due to simultaneous resource (re)-selection caused by processing time delay or lack of sensing data due to sidelink transmissions, etc. FIG. 6 illustrates a diagram 600 of a type-2 simultaneous access collision, in accordance with some aspects. Transmitting UEs are within communication range from each other (i.e., it is feasible to sense each other), however, simultaneously perform resource (re)-selection and access the channel in the same slot on overlapping resources.

(c) Type-3. (Congested Medium) Co-channel collisions due to lack of unoccupied resources (high medium congestion). TX UEs are within communication range from each other (i.e. can sense each other), however access to the channel is congested (resources are occupied) and a UE selects an occupied resource within the set of resources with minimum RX power level. In this case, collisions are not avoidable thus congestion control mechanisms should be used to reduce the rate of collisions.

The following is a list of inter-UE coordination solutions for Mode-2 resource allocation enhancements. Mode-2 is associated with autonomous resource selection (e.g., autonomous selection of time and frequency resources). In some aspects, inter-UE coordination feedback and signaling can be used to mitigate the following conflicts of NR-V2X sidelink communication: half-duplex in transmission (HD-TX); half-duplex in the reservation (HD-RSV); half-duplex in reception (HD-RX); co-channel collision in transmission (CC-TX); and co-channel collision in the reservation (CC-RSV).

To address these conflicts by inter-UE coordination, the proposed techniques introduce low latency sidelink feedback signaling. The proposed inter-UE coordination framework may include one or more of the following design components:

(a) Methods to determine sidelink collisions and half-duplex conflicts for reliable sidelink communication with inter-UE coordination feedback, including conditions to determine half-duplex and co-channel collision by RX UEs.

(b) Methods to prioritize inter-UE coordination feedback for reliable sidelink communication with inter-UE coordination feedback, including UL, SL HARQ, SL half-duplex/co-channel, and SL priority.

(c) Methods to determine UEs for inter-UE coordination feedback, including distance, RSRP, detection of half-duplex/co-channel collision events.

(d) Methods to determine inter-UE coordination feedback timing for reliable sidelink communication, including which slots to use for indication signaling and new processing times for inter-UE coordination.

(e) Methods to determine sidelink half-duplex and collision events by transmitting UEs and enhanced resource re-selection procedures, including UE autonomous detection of half-duplex and co-channel collisions and TX UE behaviors in terms of resource allocation.

(f) Methods to determine resources for sidelink transmission for inter-UE coordination feedback.

(g) Methods of inter-UE coordination feedback signaling for reliable sidelink communication.

FIGS. 7-10 illustrate problems of NR sidelink communications which can be addressed using the above methods and the disclosed techniques.

Figure 7:
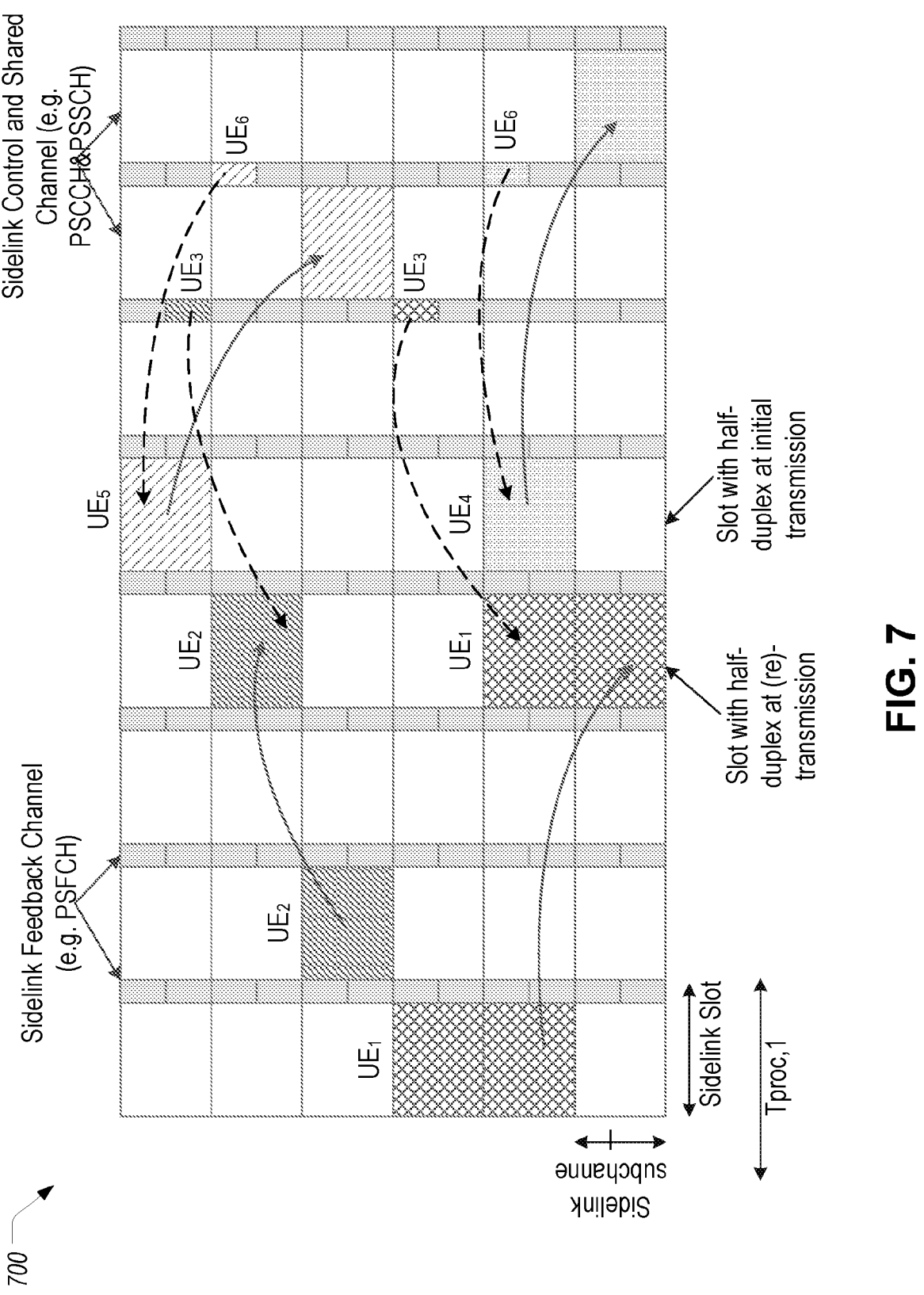
FIG. 7 illustrates a diagram of half-duplex in transmission with inter-UE coordination feedback, in accordance with some aspects.

FIG. 7 illustrates diagram 700 of half-duplex in transmission with inter-UE coordination feedback, in accordance with some aspects. More specifically, FIG. 7 illustrates conflicts of half-duplex in transmission. In particular, UE1 and UE2 have half-duplex in resources used for the re-transmission of TBs. UE3 provides feedback to UE1 and UE2 indicating half-duplex in transmission and the potential need for additional retransmissions. In addition, UE4 and UE5 have half-duplex on resources used for the initial transmission of a transport block (TB). UE6 provides feedback to UE4 and UE5 indicating half-duplex in initial transmission and the potential need for additional retransmissions.

Figure 8:
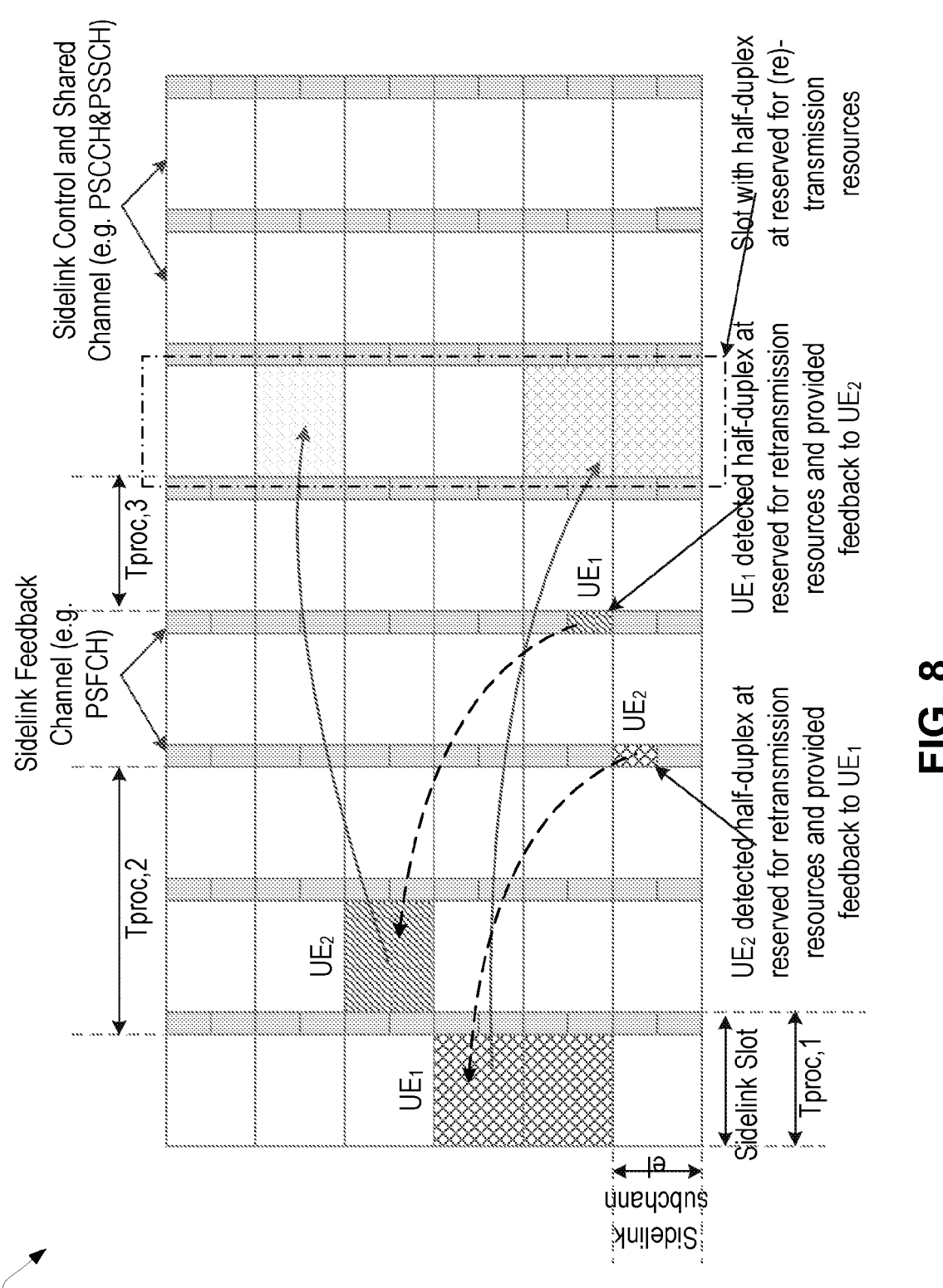
FIG. 8 illustrates a diagram of half-duplex in resource reservation with inter-UE coordination feedback, in accordance with some aspects.

FIG. 8 illustrates a diagram 800 of half-duplex in resource reservation with inter-UE coordination feedback, in accordance with some aspects. More specifically, FIG. 8 illustrates conflicts of half-duplex in the reservation. In particular, UE1 and UE2 have half-duplex in reserved resources planned for the re-transmission of TBs. For example, UE2 detects half-duplex at reserved for retransmission resources and provides feedback to UE1. In some aspects, UE1 detects half-duplex at reserved for retransmission resources and provides feedback to UE2. In some embodiments, another UE (e.g., UE3, not illustrated in FIG. 8) provides feedback to UE1 and UE2 indicating half-duplex in reservation and the potential need for the resource (re)-selection.

Figure 9:
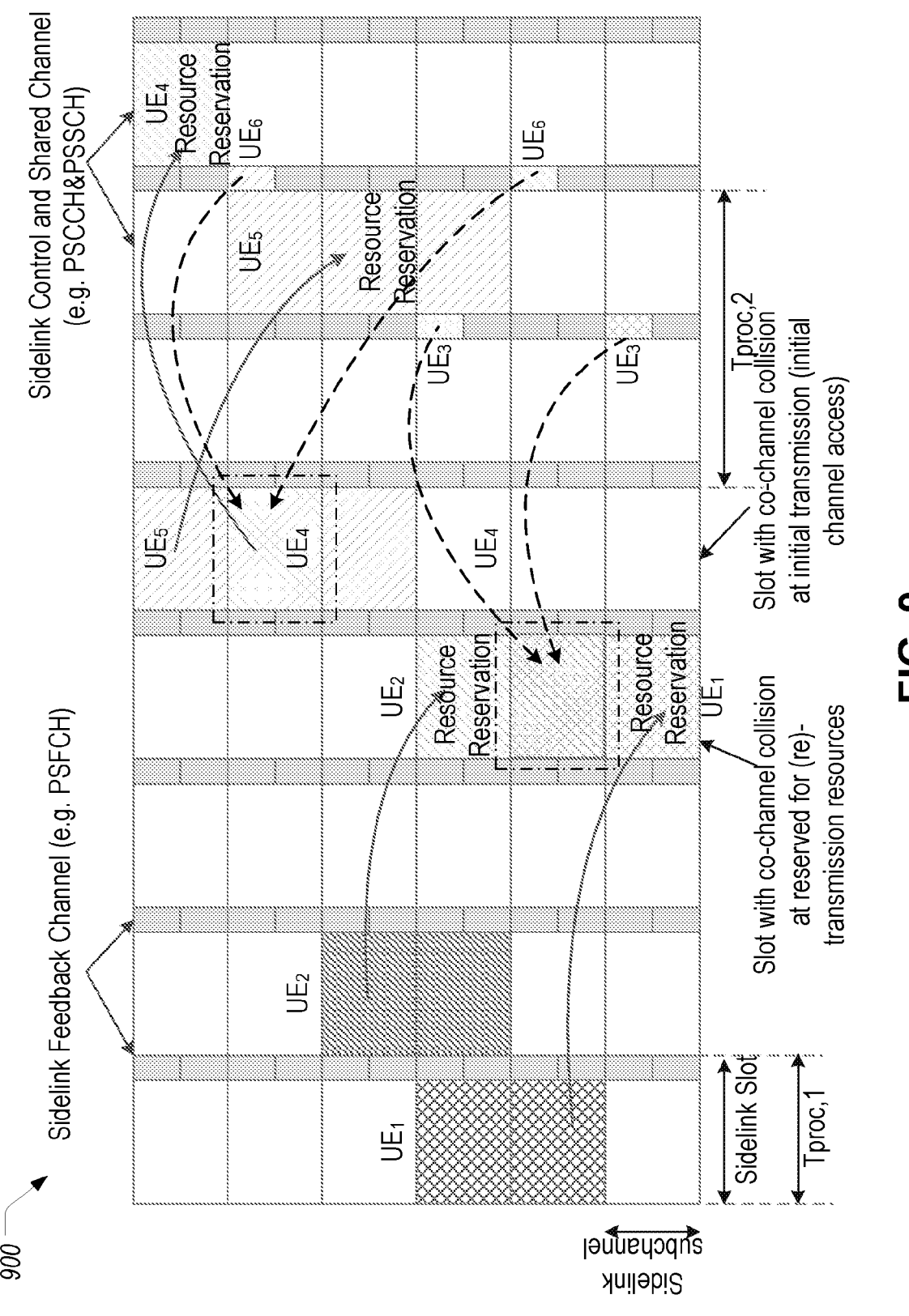
FIG. 9 illustrates a diagram of co-channel collision in transmission with inter-UE coordination feedback, in accordance with some aspects.

FIG. 9 illustrates diagram 900 of co-channel collision in transmission with inter-UE coordination feedback, in accordance with some aspects. More specifically, UE1 and UE2 have co-channel collision in resources used for the re-transmission of TBs. UE3 provides feedback to UE1 and UE2 indicating co-channel collision in transmission and the potential need for additional retransmissions. In addition, UE4 and UE5 have co-channel collision on resources used for the initial transmission of a TB. UE6 provides feedback to UE4 and UE5 indicating co-channel collision in initial transmission and the potential need for additional retransmissions.

Figure 10:
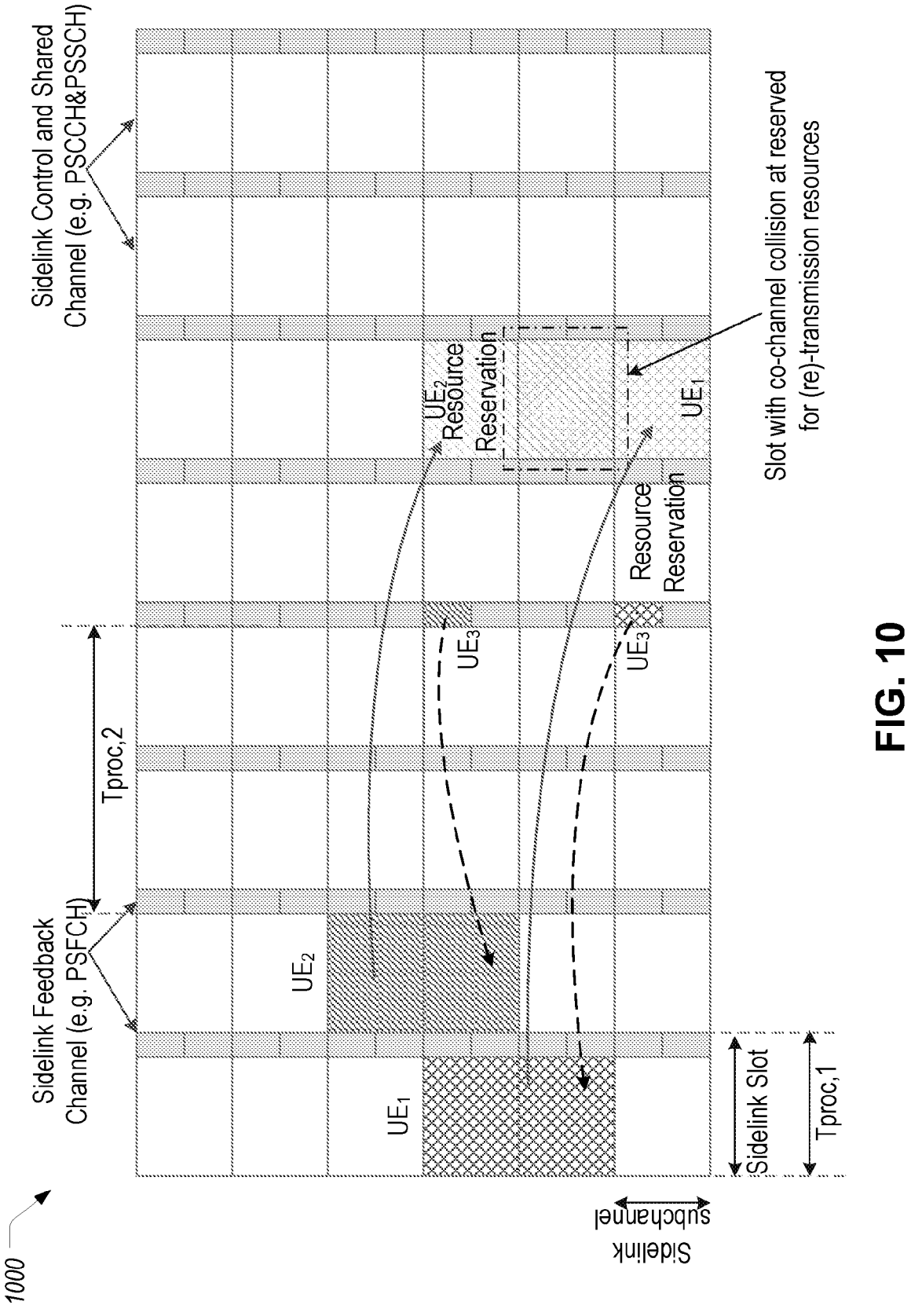
FIG. 10 illustrates a diagram of co-channel collision in reservation with inter-UE coordination feedback, in accordance with some aspects.

FIG. 10 illustrates a diagram 1000 of co-channel collision in reservation with inter-UE coordination feedback, in accordance with some aspects. More specifically, UE1 and UE2 reserved overlapped resources for the re-transmission of TBs. UE3 provides feedback to UE1 and UE2 indicating co-channel collision in reservation and the potential need for a resource (re)-selection or retransmissions.

The following SL conflicts may cause reliability concerns of NR sidelink communications which can be resolved using the disclosed techniques: half-duplex in transmission (HD-TX), half-duplex in reservation (HD-RSV), half-duplex in reception (HD-RX), co-channel collision in transmission (CC-TX), and co-channel collision in reservation (CC-RSV).

The disclosed techniques include methods to determine sidelink collisions and half-duplex conflicts for reliable sidelink communication with inter-UE coordination feedback. The disclosed techniques may include the following UE behaviors: classification of sidelink conflicts, RX-based determination of sidelink conflicts as a part of sensing procedure, RX-based feedback indicating sidelink conflicts to TX UEs, and TX-based resource allocation enhancements based on inter-UE coordination feedback.

In some aspects, support of inter-UE coordination signaling for reliable sidelink communication can be based on defining procedures for determination of half-duplex and co-channel collisions for different communication types: unicast (e.g., with ACK/NACK-based HARQ feedback or without HARQ feedback), groupcast (e.g., with NACK only HARQ feedback, with ACK/NACK HARQ feedback, or without HARQ feedback), and broadcast (e.g., without HARQ feedback).

(A) Determination of half-duplex conflicts.

To determine sidelink half-duplex conflicts (HD-TX and HD-RSV) by RX UEs, groupcast sidelink communication with NACK only feedback can be analyzed and then generalized to other communication types.

In case of groupcast sidelink transmission with NACK only feedback, UEs transmit control channel information using SCI formats (Stage 1 SCI-SCI Format 1 in PSCCH and Stage 2 SCI-SCI Format 2 multiplexed in PSSCH). In this mode, the NACK HARQ signaling over PSFCH is used if a target RX UE has not successfully decoded a TB in PSSCH transmission. The target RX UE is determined based on distance (and/or sidelink RSRP if defined in addition to the distance) value from the TX UE. In some embodiments, SL positioning/ranging information might be available and this information can also be used to determine the distance.

The following procedure can be used by the RX UE (UER) to determine, whether TX UEs (UE$_P$ and UE$_Q$) have a half-duplex conflict (some steps might not be possible in all cases):

(A.1) RX UER successfully decoded control channel transmissions (SCI Formats) from UE$_P$ and UE$_Q$.

(A.2) RX UER extracted the following information from SCIs:

(A.2.a) UE$_P$ and UE$_Q$ zone IDs (zone IDp and zone IDQ);

(A.2.b) UE$_P$ and UE$_Q$ target communication ranges (RP and RQ);

(A.2.c) UE$_P$ and UE$_Q$ L1 source IDs (or L2 source IDs);

(A.2.d) UE$_P$ and UE$_Q$ L1 destination IDs (or L2 destination IDs);

and (A.2.e) UE$_P$ and UE$_Q$ priority of sidelink transmission.

(A.3) RX UER checks whether TX UEs (UE$_P$ and UER) are within the target communication range of each other:

(A.3.a) UE$_P$ is within a target communication range of UE$_Q$ if the target communication range RQ indicated by UE$_Q$ meets pre-configured or predefined conditions:

(A.3.a.1) Example 1: RQ exceeds distance d$_{PQ}$ between centers of zones (i.e. RQ>d$_{PQ}$) derived from indicated zone IDs and zone length L.

(A.3.a.2) Other examples for generalizations are:

Example 2: RQ>d$_{PQ}$+Δ, where Δ is a function of zone length L;

Example 3: RQ>f(L, zone IDP, zone IDQ, Source IDP and Source IDQ), where f( ) is a predefined function; and Example 4: RQ>f(Coordinates of UE$_P$, Coordinates of UE$_Q$), where f( ) is a predefined function.

(A.3.b) UE$_Q$ is within a target communication range of UE$_P$ if the target communication range RP indicated by UE$_P$ meets pre-configured or predefined conditions (see above).

(A.4) RX UER checks whether TX UEs (UE$_P$ and UER) are interested in service provided by each other:

(A.4.a) UE$_P$ is interested in service provided by UE$_Q$ (e.g., UE$_P$ is a group member of UE$_Q$ that can be discovered through L1 or L2 filtering of signaled destination ID); and/or (A.4.b) UE$_Q$ is interested in service provided by UE$_P$ (e.g., UE$_Q$ is a group member of UE$_P$ that can be discovered through L1 or L2 filtering of signaled destination ID); or (A.4.c) UER is interested in one or both of UE$_P$ or UE$_Q$ services, w/o checking UE$_P$-to-UE$_Q$ service relations.

Using a similar procedure, UE$_R$ can detect whether it has a conflict of half-duplex in reception (HD-RX) with at least one of the TX UEs (UE$_P$ and/or UE$_Q$). This conflict may happen if UE$_R$ is a target RX of either or both of TX UEs (UE$_P$ or UE$_Q$) that have reserved sidelink transmission to UE$_R$ in slot 'n' and UE R has higher priority UL or SL transmission in the same slot, thus UE$_R$ cannot receive the transmissions from UE$_P$ or UE$_Q$.

As a result of SCI reception from UE$_P$ and UE$_Q$, UE$_R$ can determine the following half-duplex conflicts: half-duplex in transmission at UE$_P$ and/or UE$_Q$, half-duplex in reservation at UE$_P$ and/or UE$_Q$, half-duplex in both transmission and reservation at UE$_P$ and/or UE$_Q$, half-duplex in reception at UE$_R$, or otherwise, no half-duplex.

Irrespective of the specific half-duplex conflict the following cases are possible with respect to triggering/providing inter-UE coordination signaling based on the disclosed techniques:

(a) Case 1: $UE_P$ needs to listen to $UE_Q$ ($UE_P$ is the target RX of $UE_Q$). In the case of half-duplex in transmission, to improve the reliability of sidelink communication, UE R can provide inter-UE coordination signaling to $UE_Q$. In case of half-duplex in reservation, to improve reliability of sidelink communication, $UE_R$ can provide inter-UE coordination signaling to $UE_Q$ and/or $UE_P$.

(b) Case 2: $UE_Q$ needs to listen to $UE_P$ ($UE_Q$ is the target RX of $UE_P$). In the case of half-duplex in transmission, to improve reliability of sidelink communication, $UE_R$ can provide inter-UE coordination signaling to $UE_P$. In case of half-duplex in reservation, to improve reliability of sidelink communication, $UE_R$ can provide inter-UE coordination signaling to $UE_P$ and/or $UE_Q$.

(c) Case 3: $UE_Q$ needs to listen to $UE_P$ and $UE_P$ needs to listen to $UE_Q$ (both TX UEs ($UE_P$ and $UE_Q$) are RX targets of each other). In the case of half-duplex in transmission, to improve reliability of sidelink communication, $UE_R$ can provide inter-UE coordination signaling to $UE_P$ and/or $UE_Q$. In case of half-duplex in reservation, to improve reliability of sidelink communication, $UE_R$ can provide inter-UE coordination signaling to $UE_P$ and/or $UE_Q$.

(d) Case 4: $UE_P$ and $UE_Q$ do not need to listen to each other (TX UEs ($UE_P$ and $UE_Q$) are not target RXs of each other, i.e., not group members). In this case, no inter-UE coordination signaling is needed by $UE_R$, unless an indication of feedback on co-channel collision is required.

(e) Case 5: $UE_R$ needs to listen to either $UE_P$ and/or $UE_Q$ (i.e. one or both TX UEs ($UE_P$ and $UE_Q$) are RX targets of $UE_R$). In the case of half-duplex in reception, to improve reliability of sidelink communication, $UE_R$ can provide inter-UE coordination signaling to $UE_P$ and/or $UE_Q$ so that those can drop a transmission on reserved resources. Alternatively, $UE_R$ may also try to reselect resources for a transmission unless it is scheduled by gNB.

In some aspects, the principle to determine target RX UEs based on the distance criterion can be applied only for groupcast communication with NACK only HARQ feedback. In some aspects, this approach can be extended to other modes as a criterion to determine that TX UEs encounter half-duplex events.

In the case of groupcast sidelink transmission with ACK/NACK HARQ feedback, the indication by TX UEs ($UE_P$ and $UE_Q$) of the common group Destination ID (L1 or L2) for transmission in the same slot can be used as a criterion to determine the half-duplex event. On top of that RSRP or distance criteria can be used. In the latter case, the definition of a new SCI format for signaling TX UE coordinates may be needed or the zone ID-based principle can be reused. For example, a new SCI format 2-C(or other SCI format 2-x) may be defined which contains the union of payloads of SCI format 2-A and SCI format 2-B.

In the case of groupcast sidelink transmission without HARQ feedback, the same approach can be used as for the groupcast sidelink transmission with ACK/NACK HARQ feedback.

In case of unicast sidelink transmission with ACK/NACK HARQ feedback, RX UE may need to check if TX UEs ($UE_P$ and $UE_Q$) for transmission in the same slot indicate Destination IDs that are associated with TX UEs (e.g., Source IDQ of $UE_Q$==Destination IDp of $UE_P$ and/or Source IDp of $UE_P$== Destination ID Q of $UE_Q$).

In the case of unicast sidelink transmission without HARQ feedback, the same approach can be used as for the unicast sidelink transmission with ACK/NACK HARQ feedback.

In the case of broadcast sidelink transmission or connectionless groupcast, all transmissions by broadcasting $UE_P$ and broadcasting $UE_Q$ in the same slot by default have a half-duplex problem, therefore the criterion can be to check whether Destination IDs (L1 or L2) indicated by $UE_P$ and $UE_Q$ are associated with broadcast transmission or connectionless groupcast.

Summarizing the above description, the determination by RX UEs of half-duplex issues among $UE_P$ and $UE_Q$ transmissions can be performed by analysis of the Source and Destination IDs signaled in SCI (L1) or using higher layer signaling (L2). In addition, the distance between TX UEs can be defined as a condition to determine half-duplex among TX UEs if the distance-based criterion to determine target receivers is generalized.

(B) Indicator of half-duplex awareness.

In some aspects, the half-duplex event may be also autonomously noticed by TX UEs during sensing and resource (re)-selection procedures. For instance, $UE_P$ decoding SCI transmissions may detect half-duplex in resource reservation at resource Resp but still select it for transmission if it is qualified as a candidate resource and $UE_P$ has already successfully decoded $UE_Q$ transmission from the previous transmissions of the same TB. In this case, $UE_P$ does not need the inter-UE coordination feedback from $UE_R$. To avoid feedback $UE_P$ may need to provide information about half-duplex awareness to RX UEs ($UE_R$). For that purpose, additional or reserved fields of SCI formats can be used to carry the indicator of half-duplex awareness or request not to provide inter-UE coordination feedback.

(C) Feedback on half-duplex in reception.

The half-duplex in reception conflict may need to be differentiated from other sidelink conflicts since if RX $UE_R$ has a half-duplex problem in the reception of TX $UE_P$ transmission, there is no value in the $UE_P$ transmission and thus it should be expected to yield transmission of the reserved resources if the feedback was provided to $UE_P$ by $UE_R$ in time.

(D) Determination of co-channel collision conflicts.

If TX UEs are not group members and potentially not interested in each other's transmissions within the same slot co-channel collision problem may still exist. In some aspects, there may be a need to distinguish/differentiate collision conflicts and configure which of the collision types can be addressed by inter-UE coordination feedback:

(D. 1) Type-1: Hidden Node— TX UEs out of sensing range or have low RSRP range.

(D.2) Type-2: Simultaneous Access— TX UEs within sensing range and simultaneously access channel.

(D.3) Type-3: Congested Medium— TX UEs within sensing range and medium are congested.

The conditions to determine co-channel collision events by RX UE ($UE_R$) can comprise one or multiple of the following:

(a) RX $UE_R$ successfully decoded control channel transmissions (SCI Formats—stage 1 and/or stage 2) from $UE_P$ and $UE_Q$ and measured SL-RSRP on links toward TX UEs.

(b) RX $UE_R$ determined overlap of resources in frequency for co-channel transmissions of $UE_P$ or $UE_Q$. Proportion or % of overlapped resources in single transmission exceeds predefined or pre-configured threshold (e.g., full (100%), partial overlap (e.g. 50%), or overlap in at least one sub-channel (>0%)).

(c) RX $UE_R$ determined proximity to $UE_P$ or $UE_Q$. Can be estimated by RX $UE_R$ sidelink RSRP or distance values to TX UEs meet pre-configured settings (e.g., values are within pre-configured SL-RSRP ranges or satisfy bounds for SL-RSRP or distances).

(d) RX $UE_R$ determined/analyzed criteria related to the probability of successful reception for $UE_P$ or $UE_Q$. In some aspects, $SINR_P$ and/or $SINR_Q$ values are within preconfigured ranges for RX $UE_R$. In some aspects, predicted $PER_P$/$PER_Q$>pre-configured or pre-defined PER threshold. In some aspects, estimated Mutual Information/Capacity or Effective MCS for PSSCH for both or one of colliding UEs is smaller than a pre-configured or a pre-defined threshold. In some aspects, the priority of collided SL transmissions is greater than a pre-configured or pre-defined threshold.

Alternatively, the determination of sidelink collision by RX UEs can be left up to UE implementation.

In some aspects, the dominant type of collisions is dependent on the medium environment (e.g., the density of vehicles and intensity of transmissions). In terms of radio-layer metrics, it can be characterized by the congestion control-related measurements: Channel Occupancy Ratio (CR) and Channel Busy Ratio (CBR). These metrics can be used to adapt RX UE behavior for inter-UE coordination feedback and the related thresholds.

In some aspects, it may be possible to preclude by pre-configuration or by specification, generation of the feedback for certain collisions types. For instance, the configuration may enable only feedback for Type-2 or Type-1/Type-2 collisions. In this case, a specific set of conditions can be configured to distinguish each collision type.

In some aspects, the disclosed techniques include methods to determine sidelink half-duplex and collision events by transmitting UEs and enhanced resource re-selection procedures. The disclosed techniques include the following UE behaviors: classification of sidelink conflicts, autonomous determination of sidelink conflicts by TX UEs as a part of sensing procedure, autonomous determination of sidelink conflicts by RX UEs as a part of sensing procedure, and RX based feedback indicating sidelink conflicts to TX UEs, and TX-based resource allocation enhancements based on inter-UE coordination feedback.

The following conflicts may exist in NR sidelink communications: half-duplex in transmission (HD-TX), half-duplex in reservation (HD-RSV), half-duplex in reception (HD-RX), co-channel collision in transmission (CC-TX), and co-channel collision in reservation (CC-RSV).

In general, each of these conflicts may have an impact on TX UE behavior. In addition, some of the conflicts (e.g., conflicts in the reservation can be addressed/mitigated using either inter-UE coordination feedback or UE autonomous conflict resolution).

In some embodiments, if $UE_P$ and $UE_Q$ indicate reservation of resources in the same slot 'k' through SCI transmission in slots 'nP' and 'nQ', then TX UEs ($UE_P$ or $UE_Q$) may autonomously detect and classify some of them as well as take necessary actions. To autonomously detect conflicts in reservations, UEs need to be within communication range from each other and transmit on different slots (i.e. nP≠nQ).

In some aspects, $UE_P$ and $UE_Q$ may not reserve resources in the same slot if they transmit in different slots, however, it may be the case due to various reasons including:

(a) Sensing and resource (re)-selection processing delays;

(b) Lack of sensing results; and (c) Half-duplex events due to UE transmissions.

In the case of autonomous conflict detection and classification by TX UE ($UE_P$ or $UE_Q$), the following TX UE behaviors are possible:

(a) Option 1: Trigger resource yielding (i.e. exclude reserved resource from candidate resources) and resource (re)-selection procedure.

(a.1) Option 1A: Resource yielding is performed only if TX UE has lower sidelink transmission priority (as in Rel. 16 UE behavior when pre-emption is enabled) or the same sidelink transmission priority.

(a.2) Option 1B: Resource yielding is performed irrespective of sidelink transmission priorities.

(b) Option 2: Triggering resource (re)-selection/(re)-evaluation procedure without exclusion of the affected reserved resource from candidate resources.

(b.1) Options concerning usage of the priority.

(b.1.1) Alt. A: Resource (re)-selection/(re)-evaluation is performed only if TX UE has lower sidelink transmission priority or the same sidelink transmission priority.

(b.1.2) Alt. B: Resource (re)-selection/(re)-evaluation is performed irrespective of sidelink transmission priority.

(b.2) Usage of SL-RSRP.

In some aspects, a specific SL-RSRP threshold may be provided for a pair of prio_TX and prio RX, where prio_TX is the priority associated with the current UE transmission and prio RX is the priority received in SCI for the collided resource, configured separately from the set of SL-RSRP thresholds used for regular (re-)selection and (re-)evaluation procedure.

(c) Option 3: Continue transmission on the reserved resource.

(c.1) Option 3A: UE continues transmission on reserved resource only if UE has higher or the same sidelink transmission priority.

(c.2) Option 3B: UE continues transmission on reserved resource irrespective of sidelink transmission priority (Rel. 16 behavior if pre-emption is disabled).

(c.3) Option 4: UE behavior is left up to the implementation.

In some aspects, TX UE-based autonomous detection and classification of sidelink conflicts is feasible and beneficial for conflicts in reservations. The main benefit of UE autonomous detection of conflicts is that TX UE can extract additional information on priority and proximity of the UE engaged in the conflict and thus depending on conditions TX UEs can decide on the best strategy (i.e., described above alternative) as a behavior for subsequent transmissions. This functionality can be further complemented by inter-UE coordination feedback for conflicts in transmission and/or conflicts in reservations.

In some aspects, the TX UE behavior can be dependent on the type of the provided inter-UE coordination feedback as discussed below:

(a) If TX UE has received feedback indicating co-channel collision in transmission the following behaviors may be considered:

(a.1) Option 1: No change in behavior on top of Rel. 16 functionality. In this case, communications can support configuration that can preclude the generation of feedback for co-channel collisions by RX UEs, or feedback for co-channel collisions should not be supported by NR.

(a.2) Option 2: Retransmission adjustment.

(a.2.1) Option 2A: UE may select additional resources for retransmission until the maximum number of retransmissions for given priority is reached.

(a.2.2) Option 2B: UE may increment by $\Delta$ (e.g., $\Delta=1$) the max number of retransmissions per TB for a given priority level if it is configured for a given priority. Increment value $\Delta$ may be also dependent on the number of feedbacks received by TX UE for a given TB.

(a.2.3) Option 2C: By implementation, the UE may change the redundancy version for upcoming transmissions.

(b) If TX UE has received feedback indicating half-duplex in transmission, the same behavior as for the feedback on collision in transmission can be used.

(b.1) Given that TX UE actions can be the same there is no need to differentiate between half-duplex in transmission and collision in transmission.

(c) If TX UE has received feedback indicating half-duplex in reservation or collision in the reservation, the following behaviors may be considered:

(c.1) Option 1: No change in behavior on top of Rel. 16 functionality. In this case, communications can support configuration that can preclude the generation of feedback for half-duplex/co-channel collisions in reservations by RX UEs, or feedback for half-duplex/co-channel collisions in reservations should not be supported by NR.

(c.2) Option 2: Retransmission adjustment.

(c.2.1) Option 2A: UE may select additional resources for retransmission until the maximum number of retransmissions for given priority is reached.

(c.2.2) Option 2B: UE may increment by $\Delta$ (e.g., $\Delta=1$) the maximum number of retransmissions per TB for a given priority level if it is configured for a given priority. Increment value $\Delta$ may be also dependent on the number of feedbacks received by TX UE for a given TB.

(c.3) Option 3: Follow the same behavior as for UE autonomous conflict detection. In this case, it may be assumed that feedback also indicates the priority of the detected conflicting transmission. In some aspects, Option 1-Option 4 described for UE autonomous conflict detection and mitigation may be used as well.

(c.4) Option 4: Follow the same behavior as for UE autonomous conflict detection but without exact knowledge of sidelink transmission priority.

In this case, it may be assumed that feedback does not indicate the priority of the detected transmission in conflict and therefore TX UE should assume that conflicting transmission has either the same, higher, or lower transmission priority. The latter can be either pre-configured or pre-defined. In some aspects, Option 1-Option 4 described for UE autonomous conflict detection and mitigation may be used as well.

In some aspects, if TX UE has received feedback indicating half-duplex in reception, the Tx UE may be expected to yield transmission. On top of yielding transmission on the reserved resource, all other options described above can be used where applicable.

Figure 11:
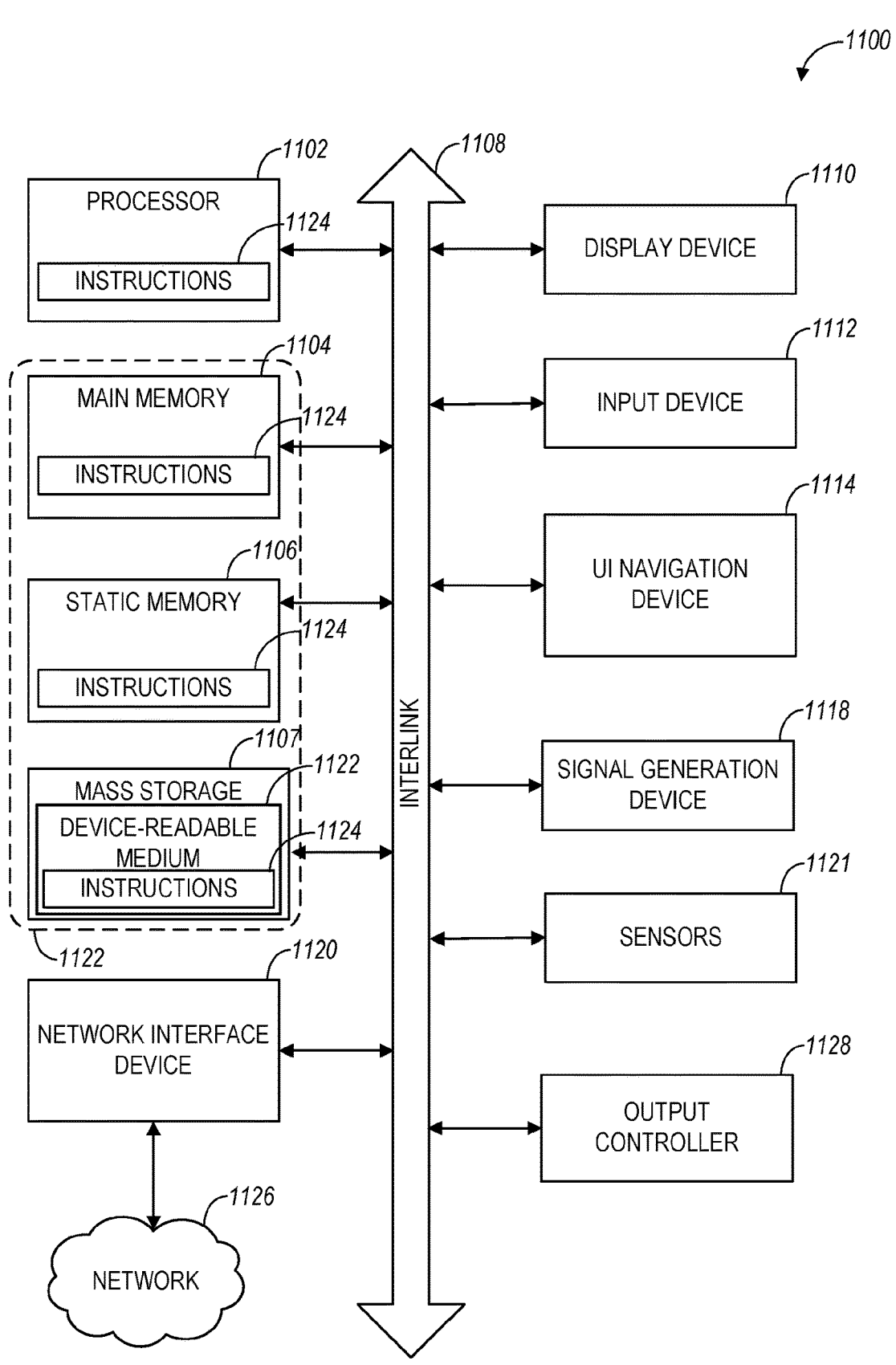
FIG. 11 illustrates a block diagram of a communication device such as an evolved Node-B (eNB), a new generation Node-B (gNB) (or another RAN node or a base station), a transmission-reception point (TRP), an access point (AP), a wireless station (STA), a mobile station (MS), or a user equipment (UE), in accordance with some aspects.

FIG. 11 illustrates a block diagram of a communication device such as an evolved Node-B (eNB), a new generation Node-B (gNB) (or another RAN node or a base station), a transmission-reception point (TRP), an access point (AP), a wireless station (STA), a mobile station (MS), or a user equipment (UE), in accordance with some aspects. In alternative aspects, the communication device 1100 may operate as a standalone device or may be connected (e.g., networked) to other communication devices.

Circuitry (e.g., processing circuitry) is a collection of circuits implemented in tangible entities of the device 1100 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1100 follow.

In some aspects, the device 1100 may operate as a standalone device or may be connected (e.g., networked) to other devices. In a networked deployment, the communication device 1100 may operate in the capacity of a server communication device, a client communication device, or both in server-client network environments. In an example, the communication device 1100 may act as a peer communication device in a peer-to-peer (P2P) (or other distributed) network environment. The communication device 1100 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 1100 may include a hardware processor 1102 (e.g., a central processing unit (CPU), a graphics processing unit (GPU), a hardware processor core, or any combination thereof), a main memory 1104, a static memory 1106, and a storage device 1107 (e.g., hard drive, tape drive, flash storage, or other block or storage devices), some or all of which may communicate with each other via an interlink (e.g., bus) 1108.

The communication device 1100 may further include a display device 1110, an alphanumeric input device 1112 (e.g., a keyboard), and a user interface (UI) navigation device 1114 (e.g., a mouse). In an example, the display device 1110, input device 1112, and UI navigation device 1114 may be a touchscreen display. The communication device 1100 may additionally include a signal generation device 1118 (e.g., a speaker), a network interface device 1120, and one or more sensors 1121, such as a global positioning system (GPS) sensor, compass, accelerometer, or another sensor. The communication device 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1107 may include a communication device-readable medium 1122, on which is stored one or more sets of data structures or instructions 1124 (e.g., software) embodying or utilized by any one or more of the techniques or functions described herein. In some aspects, registers of the processor 1102, the main memory 1104, the static memory 1106, and/or the storage device 1107 may be, or include (completely or at least partially), the device-readable medium 1122, on which is stored the one or more sets of data structures or instructions 1124, embodying or utilized by any one or more of the techniques or functions described herein. In an example, one or any combination of the hardware processor 1102, the main memory 1104, the static memory 1106, or the mass storage 1116 may constitute the device-readable medium 1122.

As used herein, the term "device-readable medium" is interchangeable with "computer-readable medium" or "machine-readable medium". While the communication device-readable medium 1122 is illustrated as a single medium, the term "communication device-readable medium" may include a single medium or multiple media (e.g., a centralized or distributed database, and/or associated caches and servers) configured to store the one or more instructions 1124. The term "communication device-readable medium" is inclusive of the terms "machine-readable medium" or "computer-readable medium", and may include any medium that is capable of storing, encoding, or carrying instructions (e.g., instructions 1124) for execution by the communication device 1100 and that causes the communication device 1100 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 1124 may further be transmitted or received over a communications network 1126 using a transmission medium via the network interface device 1120 utilizing any one of a number of transfer protocols. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input-multiple-output (SIMO), MIMO, or multiple-input-single-output (MISO) techniques. In some examples, the network interface device 1120 may wirelessly communicate using Multiple User MIMO techniques.

The term "transmission medium" shall be taken to include any intangible medium that is capable of storing, encoding, or carrying instructions for execution by the communication device 1100, and includes digital or analog communications signals or another intangible medium to facilitate communication of such software. In this regard, a transmission medium in the context of this disclosure is a device-readable medium.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination as illustrated below by way of examples.

Example 1 is an apparatus for a user equipment (UE) configured for operation in a Fifth Generation New Radio (5G NR) network, the apparatus comprising: processing circuitry, wherein to configure the UE for sidelink operation in the 5G NR network, the processing circuitry is to: encode a first sidelink control information (SCI) for transmission, the first SCI including a first resource reservation for a subsequent sidelink transmission by the UE in a pre-selected slot; decode a second SCI received from a second UE, the second SCI including a second resource reservation for a subsequent sidelink transmission by the second UE in the pre-selected slot; detect a reservation conflict based on the first resource reservation and the second resource reservation using the pre-selected slot; and encode a third SCI for transmission based on detection of the reservation conflict, the third SCI including a modified version of the first resource reservation for the subsequent sidelink transmission by the UE; and a memory coupled to the processing circuitry and configured to store the first SCI, the second SCI, and the third SCI.

In Example 2, the subject matter of Example 1 includes subject matter where the processing circuitry is configured to exclude the pre-selected slot from candidate sidelink resources to obtain modified sidelink resources.

In Example 3, the subject matter of Example 2 includes subject matter where the processing circuitry is configured to: select a second slot from the modified sidelink resources; and configure the third SCI to indicate the second slot as the modified version of the first resource reservation.

In Example 4, the subject matter of Examples 2-3 includes subject matter where the processing circuitry is configured to exclude the pre-selected slot from candidate sidelink resources based on a sidelink transmission priority associated with the subsequent sidelink transmission by the UE.

In Example 5, the subject matter of Example 4 includes subject matter where the processing circuitry is configured to exclude the pre-selected slot from candidate sidelink resources when the sidelink transmission priority is lower than a sidelink transmission priority associated with the subsequent sidelink transmission by the second UE.

In Example 6, the subject matter of Examples 1-5 includes subject matter where the processing circuitry is configured to determine using the second SCI, a sidelink transmission priority associated with the subsequent sidelink transmission by the second UE.

In Example 7, the subject matter of Example 6 includes subject matter where the processing circuitry is configured to determine whether to proceed with the subsequent sidelink transmission by the UE in the pre-selected slot based on the sidelink transmission priority associated with the subsequent sidelink transmission by the second UE.

In Example 8, the subject matter of Examples 6-7 includes subject matter where the processing circuitry is configured to determine to proceed with the subsequent sidelink transmission by the UE in the pre-selected slot when the sidelink transmission priority is associated with the subsequent sidelink transmission by the second UE is lower than a sidelink transmission priority associated with the subsequent sidelink transmission by the UE.

In Example 9, the subject matter of Examples 1-8 includes subject matter where the processing circuitry is configured to decode feedback information from the second UE, the feedback information indicating the reservation conflict based on the first resource reservation, and the second resource reservation using the pre-selected slot; and encode a fourth SCI for transmission based on the feedback information, the fourth SCI including the modified version of the first resource reservation, the modified version indicating a second slot for the subsequent sidelink transmission by the UE.

In Example 10, the subject matter of Examples 1-9 includes, transceiver circuitry coupled to the processing circuitry; and one or more antennas coupled to the transceiver circuitry.

Example 11 is a computer-readable storage medium that stores instructions for execution by one or more processors of a user equipment (UE), the instructions to configure the UE for sidelink operation in a Fifth Generation New Radio (5G NR) network and to cause the UE to perform operations comprising: encoding a first sidelink control information (SCI) for transmission, the first SCI including a first resource reservation for a subsequent sidelink transmission by the UE in a pre-selected slot; decoding feedback information from a second UE, the feedback information indicating a reservation conflict based on the first resource reservation and a second resource reservation by the second UE using the pre-selected slot; and encoding a second SCI for transmission based on the feedback information, the second SCI including a modified version of the first resource reservation, the modified version indicating a second slot for the subsequent sidelink transmission by the UE.

In Example 12, the subject matter of Example 11 includes, the operations further comprising: decoding a third SCI received from the second UE; determining using the third SCI, a sidelink transmission priority associated with the second resource reservation by the second UE; and determining whether to proceed with the subsequent sidelink transmission by the UE in the pre-selected slot based on the sidelink transmission priority associated with the second resource reservation by the second UE.

Example 13 is a computer-readable storage medium that stores instructions for execution by one or more processors of a user equipment (UE), the instructions to configure the UE for sidelink operation in a Fifth Generation New Radio (5G NR) network, and to cause the UE to perform operations comprising: encoding a first sidelink control information (SCI) for transmission, the first SCI including a first resource reservation for a subsequent sidelink transmission by the UE in a pre-selected slot; decoding a second SCI received from a second UE, the second SCI including a second resource reservation for a subsequent sidelink transmission by the second UE in the pre-selected slot; detecting a reservation conflict based on the first resource reservation and the second resource reservation using the pre-selected slot; and encoding a third SCI for transmission based on detection of the reservation conflict, the third SCI including a modified version of the first resource reservation for the subsequent sidelink transmission by the UE.

In Example 14, the subject matter of Example 13 includes, the operations further comprising: excluding the pre-selected slot from candidate sidelink resources to obtain modified sidelink resources.

In Example 15, the subject matter of Example 14 includes, the operations further comprising: selecting a second slot from the modified sidelink resources and configuring the third SCI to indicate the second slot as the modified version of the first resource reservation.

In Example 16, the subject matter of Examples 14-15 includes, the operations further comprising: excluding the pre-selected slot from candidate sidelink resources based on a sidelink transmission priority associated with the subsequent sidelink transmission by the UE.

In Example 17, the subject matter of Example 16 includes, the operations further comprising: excluding the pre-selected slot from candidate sidelink resources when the sidelink transmission priority is lower than a sidelink transmission priority associated with the subsequent sidelink transmission by the second UE.

In Example 18, the subject matter of Examples 13-17 includes, the operations further comprising: determining using the second SCI, a sidelink transmission priority associated with the subsequent sidelink transmission by the second UE.

In Example 19, the subject matter of Example 18 includes, the operations further comprising: determining whether to proceed with the subsequent sidelink transmission by the UE in the pre-selected slot based on the sidelink transmission priority associated with the subsequent sidelink transmission by the second UE.

In Example 20, the subject matter of Examples 18-19 includes, the operations further comprising: determining to proceed with the subsequent sidelink transmission by the UE in the pre-selected slot when the sidelink transmission priority associated with the subsequent sidelink transmission by the second UE is lower than a sidelink transmission priority associated with the subsequent sidelink transmission by the UE.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for user equipment (UE) configured for operation in a Fifth Generation New Radio (5G NR) network, the apparatus comprising:

processing circuitry, wherein to configure the UE for sidelink communication in the 5G NR network, the processing circuitry is to:

decode sidelink control information (SCI) format 1-A to obtain a set of resources, the set of resources comprising one or more slots and resource blocks reserved for a physical sidelink shared channel (PSSCH) transmission;

detect a half-duplex conflict associated with a slot in the set of resources; and encode conflict information about the half-duplex conflict for transmission to a second UE via a physical sidelink feedback channel (PSFCH); and memory coupled to the processing circuitry and configured to store the SCI.

2. The apparatus of claim 1, wherein the UE is an intended receiver of the second UE for the one or more slots reserved for the PSSCH transmission.

3. The apparatus of claim 2, wherein the UE is to refrain from a reception on the PSSCH due to half-duplex operation in the one or more slots when the half-duplex conflict was detected.

4. The apparatus of claim 1, wherein the processing circuitry is configured to:

exclude the slot from the set of resources to obtain modified sidelink resources.

5. The apparatus of claim 4, wherein the processing circuitry is configured to:

encode a second SCI for transmission to the second UE based on detection of the half-duplex conflict, the second SCI including the modified sidelink resources.

6. The apparatus of claim 4, wherein the processing circuitry is configured to:

exclude the slot from the set of resources based on a sidelink transmission priority associated with the PSSCH transmission by the UE.

7. The apparatus of claim 6, wherein the processing circuitry is configured to:

exclude the slot from the set of resources when the sidelink transmission priority is lower than a sidelink transmission priority associated with a subsequent sidelink transmission by the second UE.

8. The apparatus of claim 7, wherein the processing circuitry is configured to:

determine to proceed with a subsequent sidelink transmission by the UE in the slot when the sidelink transmission priority associated with the subsequent sidelink transmission by the second UE is lower than a sidelink transmission priority associated with a subsequent sidelink transmission by the UE.

9. The apparatus of claims 4, wherein the processing circuitry is configured to:

decode feedback information from the second UE, the feedback information indicating the half-duplex conflict; and encode a second SCI for transmission based on the feedback information, the second SCI including the modified sidelink resources, and the modified sidelink resources indicating a second slot for a subsequent sidelink transmission by the UE.

10. The apparatus of claim 1, further comprising:

transceiver circuitry coupled to the processing circuitry; and one or more antennas coupled to the transceiver circuitry.

11. A non-transitory computer-readable storage medium that stores instructions for execution by one or more processors of a user equipment (UE), the instructions to configure the UE for sidelink operation in a Fifth Generation New Radio (5G NR) network, and to cause the UE to perform operations comprising:

encoding a first sidelink control information (SCI) for transmission, the first SCI including a first resource reservation for a subsequent sidelink transmission by the UE in a pre-selected slot;

decoding feedback information from a second UE, the feedback information indicating a reservation conflict based on the first resource reservation and a second resource reservation by the second UE using the pre-selected slot; and encoding a second SCI for transmission based on the feedback information, the second SCI including a modified version of the first resource reservation, the modified version indicating a second slot for the subsequent sidelink transmission by the UE.

12. The non-transitory computer-readable storage medium of claim 11, the operations further comprising:

decoding a third SCI received from the second UE;

determining using the third SCI, a sidelink transmission priority associated with the second resource reservation by the second UE; and determining whether to proceed with the subsequent sidelink transmission by the UE in the pre-selected slot based on the sidelink transmission priority associated with the second resource reservation by the second UE.

13. A non-transitory computer-readable storage medium that stores instructions for execution by one or more processors of a user equipment (UE), the instructions to configure the UE for sidelink communication in a Fifth Generation New Radio (5G NR) network, and to cause the UE to perform operations comprising:

decoding sidelink control information (SCI) format 1-A to obtain a set of resources, the set of resources comprising one or more slots and resource blocks reserved for a physical sidelink shared channel (PSSCH) transmission;

detecting a half-duplex conflict associated with a slot in the set of resources; and encoding conflict information about the half-duplex conflict for transmission to a second UE via a physical sidelink feedback channel (PSFCH).

14. The non-transitory computer-readable storage medium of claim 13, wherein the UE is an intended receiver of the second UE for the one or more slots reserved for the PSSCH transmission.

15. The non-transitory computer-readable storage medium of claim 14, wherein the UE is to refrain from a reception on the PSSCH due to half-duplex operation in the one or more slots when the half-duplex conflict was detected.

16. The non-transitory computer-readable storage medium of claim 13, the operations further comprising:

excluding the slot from the set of resources to obtain modified sidelink resources.

17. The non-transitory computer-readable storage medium of claim 16, the operations further comprising:

encoding a second SCI for transmission to the second UE based on detection of the half-duplex conflict, the second SCI including the modified sidelink resources.

18. The non-transitory computer-readable storage medium of claim 16, the operations further comprising:

excluding the slot from the set of resources based on a sidelink transmission priority associated with the PSSCH transmission by the UE.

19. The non-transitory computer-readable storage medium of claim 18, the operations further comprising:

excluding the slot from the set of resources when the sidelink transmission priority is lower than a sidelink transmission priority associated with a subsequent sidelink transmission by the second UE.

20. The non-transitory computer-readable storage medium of claim 19, the operations further comprising:

determining to proceed with a subsequent sidelink transmission by the UE in the slot when the sidelink transmission priority associated with the subsequent sidelink transmission by the second UE is lower than a sidelink transmission priority associated with a subsequent sidelink transmission by the UE.

* * * * *